United States Patent
Guo et al.

(10) Patent No.: US 12,541,291 B2
(45) Date of Patent: Feb. 3, 2026

(54) METHOD, APPARATUS, ELECTRONIC DEVICE AND STORAGE MEDIUM FOR DISPLAYING REMINDING INFORMATION

(71) Applicant: Beijing Zitiao Network Technology Co., Ltd., Beijing (CN)

(72) Inventors: Xinlei Guo, Beijing (CN); Ronghui Zhang, Beijing (CN); Shijie Liu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 217 days.

(21) Appl. No.: 18/574,988

(22) PCT Filed: Sep. 15, 2022

(86) PCT No.: PCT/CN2022/119050
§ 371 (c)(1),
(2) Date: Dec. 28, 2023

(87) PCT Pub. No.: WO2023/040967
PCT Pub. Date: Mar. 23, 2023

(65) Prior Publication Data
US 2024/0302947 A1    Sep. 12, 2024

(30) Foreign Application Priority Data
Sep. 16, 2021    (CN) .......................... 202111089044.2

(51) Int. Cl.
G06F 3/04842    (2022.01)
G06F 40/174    (2020.01)
(52) U.S. Cl.
CPC ........ *G06F 3/04842* (2013.01); *G06F 40/174* (2020.01)

(58) Field of Classification Search
CPC .................................................. G06F 3/04842
(Continued)

(56) References Cited

U.S. PATENT DOCUMENTS 6,292,830 B1 * 9/2001 Taylor .................... G06N 5/043
709/224
7,640,165 B2 * 12/2009 Mukund .............. G06Q 10/109
705/1.1

(Continued)

FOREIGN PATENT DOCUMENTS

| CN | 107274071 A | 10/2017 |
| CN | 108196840 A | 6/2018 |

(Continued)

OTHER PUBLICATIONS

International Search Report (with English translation) and Written Opinion issued in PCT/CN2022/119050, dated Nov. 29, 2022, 10 pages provided.

(Continued)

*Primary Examiner* — Reza Nabi
(74) *Attorney, Agent, or Firm* — Astute IP Law Group

(57) ABSTRACT

The disclosure relates to the technical field of computers, and in particular to a method and apparatus for displaying reminding information, and an electronic device and a storage medium. The method for displaying the reminding information provided by the disclosure includes displaying an information editing interface; determining whether a preset condition is satisfied; and in response to determining that the preset condition is satisfied, displaying an added personnel reminding identifier in an information editing area within the information editing interface, the added personnel reminding identifier being used for reminding a current user to associate a corresponding person with information input in the information editing area.

17 Claims, 7 Drawing Sheets

(58) Field of Classification Search
USPC .......................................................... 715/771
See application file for complete search history.

(56) References Cited

U.S. PATENT DOCUMENTS

| | | | | |
|---|---|---|---|---|
| 9,852,382 | B2* | 12/2017 | Rangaswamy | G06Q 10/0633 |
| 10,616,151 | B1* | 4/2020 | Cameron | H04L 51/52 |
| 11,113,667 | B1* | 9/2021 | Jiang | H04L 12/1822 |
| 11,138,021 | B1* | 10/2021 | Rosenstein | G06Q 10/063114 |
| 11,204,683 | B1* | 12/2021 | Sabo | G06F 3/04817 |
| 11,921,998 | B2* | 3/2024 | Triverio | G06F 3/04817 |
| 2003/0097273 | A1* | 5/2003 | Carpenter, Jr. | G06Q 10/109 |
| | | | | 705/301 |
| 2004/0006566 | A1* | 1/2004 | Taylor | G06Q 10/10 |
| 2004/0059709 | A1* | 3/2004 | Farrands | G06Q 10/06 |
| 2010/0198614 | A1* | 8/2010 | Chopra | G16H 10/60 |
| | | | | 705/2 |
| 2011/0113449 | A1* | 5/2011 | Raine | H04N 21/4858 |
| | | | | 725/52 |
| 2011/0264526 | A1* | 10/2011 | Mital | G06Q 30/0603 |
| | | | | 707/706 |
| 2013/0179799 | A1* | 7/2013 | Savage | G06F 3/0482 |
| | | | | 715/751 |
| 2014/0365929 | A1* | 12/2014 | Ding | G06F 3/0486 |
| | | | | 715/765 |
| 2015/0100503 | A1* | 4/2015 | Lobo | G06Q 10/103 |
| | | | | 705/301 |
| 2015/0154528 | A1* | 6/2015 | Kharraz Tavakol | |
| | | | | G06Q 10/063114 |
| | | | | 705/2 |
| 2017/0277396 | A1* | 9/2017 | Chung | G06F 3/0482 |
| 2017/0285879 | A1* | 10/2017 | Pilkington | G06F 40/174 |
| 2017/0352008 | A1 | 12/2017 | Gao et al. | |
| 2019/0007511 | A1* | 1/2019 | Rodriguez | H04L 67/55 |
| 2019/0147026 | A1* | 5/2019 | Jon | G06F 3/04883 |
| | | | | 715/230 |
| 2020/0012977 | A1* | 1/2020 | Lehmann | G06Q 10/06316 |
| 2020/0176106 | A1* | 6/2020 | Pieroni | G06Q 10/105 |
| 2020/0341801 | A1* | 10/2020 | Aziz | H04L 63/102 |
| 2021/0117211 | A1* | 4/2021 | Hahn | G06Q 10/107 |
| 2022/0367016 | A1* | 11/2022 | Ginsburg | G16H 40/63 |
| 2023/0206152 | A1* | 6/2023 | Nouri | G06Q 10/06316 |
| | | | | 705/7.22 |
| 2024/0302947 | A1* | 9/2024 | Guo | G06F 3/04895 |
| 2025/0252400 | A1* | 8/2025 | Chasen | G06F 3/04855 |

FOREIGN PATENT DOCUMENTS

| | | | | |
|---|---|---|---|---|
| CN | 109905314 | A | | 6/2019 |
| CN | 110868639 | A * | 3/2020 | ......... H04N 21/4882 |
| CN | 112040330 | A | | 12/2020 |
| CN | 112346806 | A | | 2/2021 |
| CN | 113269513 | A | | 8/2021 |
| CN | 113741757 | A | | 12/2021 |

OTHER PUBLICATIONS

Office Action issued in corresponding Chinese Application No. 202111089044.2, dated Dec. 29, 2022, with English machine translation, 8 pages provided.

Office Action issued in corresponding Chinese Application No. 202111089044.2, dated Aug. 22, 2023, with English machine translation, 12 pages provided.

* cited by examiner

METHOD, APPARATUS, ELECTRONIC DEVICE AND STORAGE MEDIUM FOR DISPLAYING REMINDING INFORMATION

CROSS-REFERENCE OF RELATED APPLICATION(S)

This present application is based on and claims priority to Chinese Patent Application No. 202111089044.2, filed on Sep. 16, 2021, entitled "Method, Apparatus, Electronic Device and Storage Medium for Displaying Reminding Information", which is hereby incorporated by reference in its entirety.

FIELD

The present disclosure relates to the field of computer technology, and specifically relates to a method, apparatus, electronic device, and storage medium for displaying reminding information.

BACKGROUND

When a user deals with matters involving team task division, assigning a specific task to a specific responsible person or an executor, and reminding relevant task information to the relevant responsible person or executor (such as @ a user) facilitates timely task execution and feedback. How to remind and guide the user to add relevant personnel during a task creation process is a problem that needs to be solved.

SUMMARY

The Summary section is provided to briefly introduce concepts, which will be described in detail in the following detailed description sections. This Summary section is not intended to identify key features or essential features of the claimed technical solutions, nor is it intended to limit the scope of the claimed technical solutions.

In a first aspect, according to one or more embodiments of the disclosure, there is provided a method for displaying reminding information, comprising:
  displaying an information editing interface;
  determining whether a preset condition is satisfied; and
  in response to determining that the preset condition is satisfied, displaying an added personnel reminding identifier in an information editing area within the information editing interface, the added personnel reminding identifier being used for reminding a current user to associate a corresponding person with information input in the information editing area.

In a second aspect, according to one or more embodiments of the disclosure, there is provided an apparatus for displaying reminding information, comprising:
  an interface display unit configured to display an information editing interface;
  a user determination unit configured to determine whether a preset condition is satisfied;
  a reminding unit configured to in response to determining that the preset condition is satisfied, display an added personnel reminding identifier in an information editing area within the information editing interface, the added personnel reminding identifier being used for reminding a current user to associate a corresponding person with information input in the information editing area.

In a third aspect, according to one or more embodiments of the disclosure, there is provided an electronic device, comprising: at least one memory and at least one processor; wherein the memory is used for storing program codes, the processor is used to invoke the program codes stored in the memory to cause the electronic device to perform a method of displaying reminding information provided in accordance with one or more embodiments of the disclosure.

In a fourth aspect, according to one or more embodiments of the disclosure, there is provided a non-transitory computer storage medium storing program code, when executed by a computer device, causes the computer device to perform a method of displaying reminding information provided in accordance with one or more embodiments of the present disclosure.

According to one or more embodiments of the present disclosure, in response to that a preset condition is satisfied, an added personnel reminding identifier is displayed in an information editing area, so that it can timely remind the current user to input a corresponding person associated with information input in the information editing area, which facilitates the information being processed and responded to by the relevant person in a timely manner.

BRIEF DESCRIPTION OF THE DRAWINGS

In conjunction with the accompanying drawings and with reference to the following detailed description, the above and other features, advantages and aspects of the various embodiments of the present will become more apparent. Throughout the drawings, identical or similar reference signs represent identical or similar elements. It should be understood that the drawings are illustrative and that the originals and elements are not necessarily drawn to scale.

DETAILED DESCRIPTION

Figure 1:
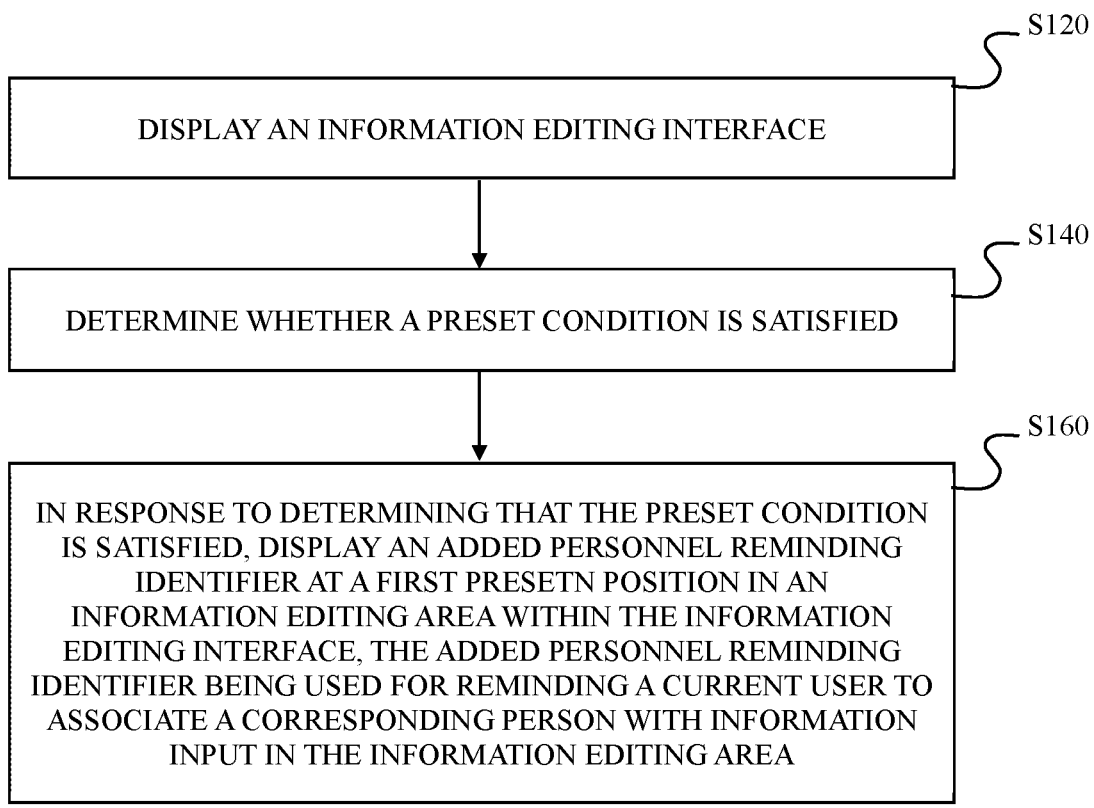
FIG. 1 is a flowchart of a method of displaying reminding information according to another embodiment of the present disclosure.

The following embodiments of the disclosure will be described in more detail with reference to the accompanying drawings. Although certain embodiments of the disclosure are shown in the drawings, it should be understood that the disclosure can be implemented in various forms and should not be construed as limited to embodiments set forth herein. On the contrary, these embodiments are provided for a more thorough and complete understanding of the disclosure. It should be understood that the drawings and embodiments of the present disclosure are for illustrative purposes only and are not intended to limit the scope of the present disclosure.

It should be understood that the steps described in the disclosure can be executed in different orders and/or in parallel. In addition, embodiments can include additional steps and/or omit the shown steps. The scope of the disclosure is not limited in this regard.

The terms "comprise" and "including" and its variations used in this article are open-ended including, that is, "including but not limited to". The term "based on" means "at least partially based on". The term "one embodiment" means "at least one embodiment"; the term "another embodiment" means "at least one other embodiment"; and the term "some embodiments" means "at least some embodiments". The term "responding to" and related terms refer to a signal or event being affected to some extent by another signal or event, but not necessarily completely or directly affected. If event x occurs "in response" to event y, then x can respond directly or indirectly to y. For example, the appearance of y may ultimately lead to the occurrence of x, but there may be other intermediate events and/or conditions. In other cases, y may not necessarily lead to the occurrence of x, and x may occur even if y has not yet occurred. In addition, the term "responding to" can also mean "at least partially responding to".

The term "determine" covers a wide variety of actions, including acquisition, calculation, processing, derivation, investigation, searching (e.g., searching in tables, databases, or other data structures), probing, and similar actions, as well as receiving (e.g., receiving information), accessing (e.g., accessing data in memory), and similar actions, as well as parsing, selecting, establishing, and similar actions. Relevant definitions of other terms will be given in the following description. Relevant definitions of other terms will be given in the following description.

It should be noted that the concepts of "first" and "second" mentioned in this disclosure are only used to distinguish different devices, modules, or units, and are not used to limit the order or interdependence of the functions performed by these devices, modules, or units.

It should be noted that the modifications of "one" and "a plurality of/multiple" mentioned in this disclosure are illustrative and not restrictive. Those skilled in the art should understand that unless otherwise specified in the context, they should be understood as "one or more".

For purposes of this disclosure, the phrase "A and/or B" means (A), (B), or (A and B).

The names of the messages or information exchanged between the plurality of devices in implementations of this disclosure are for illustrative purposes only and are not intended to limit the scope of these messages or information.

Referring to FIG. 1, FIG. 1 shows a flowchart of a method 100 of displaying reminding information provided in one embodiment of the present disclosure, the method 100 includes:

Step S120: displaying an information editing interface.

By way of example, the information editing interface may be an interface within an application or a web page. A user can create and edit information in the information editing interface. The information that can be created and edited includes but is not limited to task information, project information, and the like.

Step S140: determining whether a preset conditions is satisfied.

In some embodiments, the preset condition may include at least one of the following: a current user satisfying the preset condition; a focus being located in the information editing area; or no preset field input in the information editing. For example, the current user satisfying the preset condition include the current user having a target association relationship with at least one other user, or the current user being a user with a preset level; where the target association relationship includes a superior-subordinate relationship.

Step S160: in response to determining that the preset condition is satisfied, displaying an added personnel reminding identifier in an information editing area within the information editing interface, the added personnel reminding identifier being used for reminding a current user to associate a corresponding person with information input in the information editing area.

In some embodiments, the preset condition "the current user satisfying the preset condition" may act as added personnel reminding identifier in a prerequisite condition in the information editing interface. For example, under a condition that the prerequisite condition is satisfied, the added personnel reminding identifier may be loaded and displayed by default, after the information editing interface is open.

Further, in some embodiments, one or more of the other preset conditions may be further used as a condition for currently displaying the added personnel reminding identifier on the information editing interface when the prerequisite condition "the current user satisfying the preset condition" is satisfied. For example, in response to determining that the current user satisfying the preset condition, the add personnel information may be displayed in the information editing area when the focus is locating in the information editing area.

In some embodiments, the added personnel reminding identifier may be displayed at a preset position of the information editing area. For example, the added personnel reminding identifier may be displayed in an information input box within the information editing area. Alternatively, when the information input box displays field prompt information, the added personnel reminding identifier may be displayed adjacent to the field prompt information.

For example, the added personnel reminding identifier may display words such as "@person in charge", "@executor", and "@Add Person" and the like to remind the current user of the relevant personnel associated with the input information. The information editing area can include graphical interface elements such as information input box (es), icon(s), and control(s).

According to one or more embodiments of the present disclosure, in response to a preset condition is satisfied, the added personnel reminding identifier is displayed in the information editing area, so that the current user can be reminded in a timely manner of associating a corresponding perform with the information input in information editing area, which is conducive to information being processed and responded to by relevant personnel in a timely manner.

Figure 2:
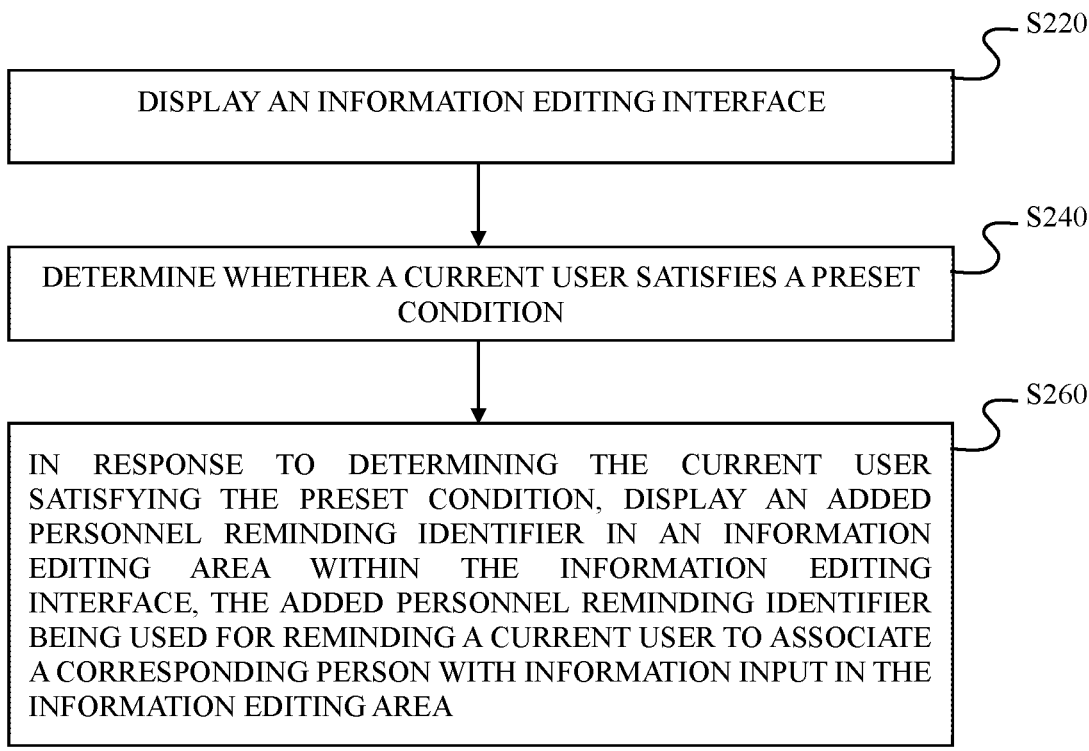
FIG. 2 is a flowchart of a method of displaying reminding information according to another embodiment of the present disclosure.

Referring to FIG. 2, FIG. 2 shows a flowchart of a method 100 of displaying reminding information according to an embodiment of the present disclosure, the method 100 includes:

Step S220: displaying an information editing interface.

Step S240: determining whether a current user satisfies a preset condition.

where, the current user includes the user currently logged in the application or webpage.

In some embodiments, the preset condition may include the current user having a target association with at least one other user. For example, the target association may include a superior-subordinate relationship, for example, the current user is at least one other user's superior.

Step S260: in response to determining that the current user satisfies the preset condition, displaying an added personnel reminding identifier at a first preset position in the information editing area within the information editing interface, and the added personnel reminding identifier is used to remind the current user of the personnel associated with the information input in the information editing area.

Figure 3:
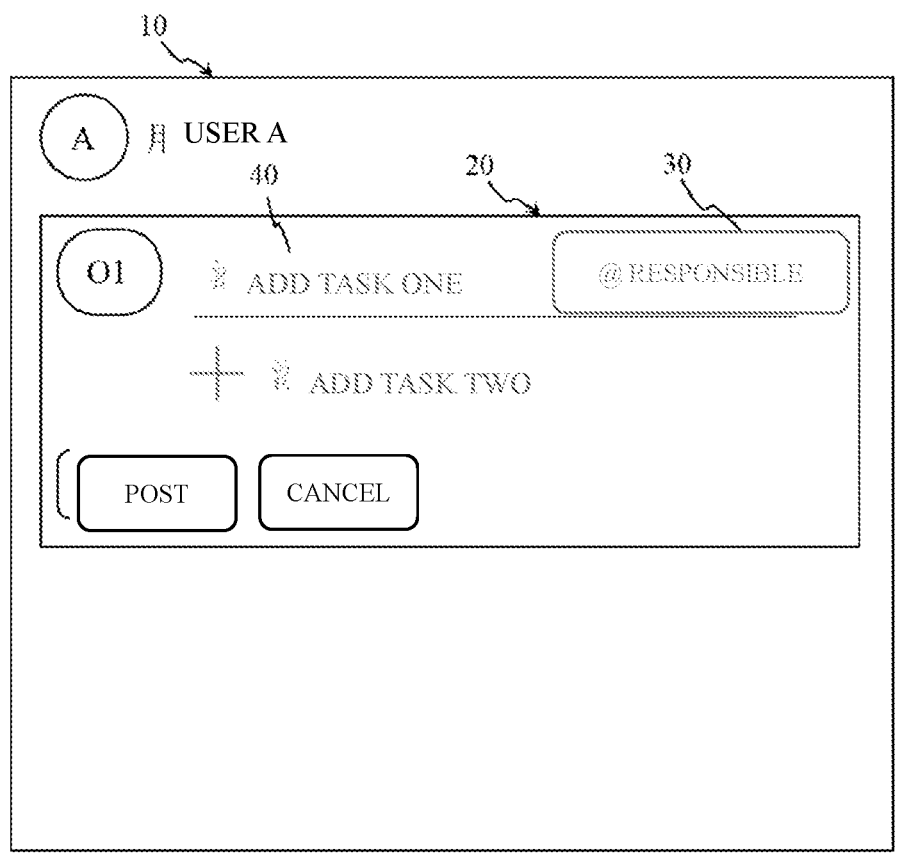
FIG. 3 is a schematic diagram of an information editing interface provided according to an embodiment of the present disclosure.

Referring to FIG. 3, when it is determined that the current user satisfies the preset condition, an add reminder identifier 30 is displayed in the information editing area 20 of the information editing interface 10, and the add reminder identifier 30 is displayed on the right side of the field prompt information 40 "Add Task 1".

According to one or more embodiments of the present disclosure, in response to determining that the current user satisfies a preset condition, the added personnel reminding identifier is displayed at a first preset position in the information editing area, so that the current user can be reminded in a timely manner of associating a corresponding perform with the information input in information editing area, which is conducive to information being processed and responded to by relevant personnel in a timely manner.

In some embodiments, step S160 or step S260 includes:

Step A1: when the focus is in the information editing area, displaying the added personnel reminding identifier in the information editing area.

For example, when the current user inputs information in the information editing area, the focus is located at the information editing area, and meanwhile, the added personnel reminding identifier is displayed at the first preset position of the information editing area.

In some embodiments, step A1 further includes: when the focus is in the information editing area and input information in the information editing area is empty, the added personnel reminding identifier may be displayed in the information editing area.

According to one or more embodiments of the present disclosure, when the focus is located in the information editing area, the added personnel reminding identifier is displayed in the information editing area, which can effectively remind the current user who is editing information of associating the relevant personnel with the editing information.

The method according to one or more embodiments of the present disclosure, further includes:

Step B1: when the information input in the information editing area is empty, displaying field prompt information in the information editing area; a displaying position of the field prompt information being located adjacent to a displaying position of the added personnel reminding identifier.

For example, if the current user does not enter information in the information editing area or deletes information after entering it, the field prompt information and the add personnel reminding identification are displayed in the information editing area.

In some embodiments, field reminding information can be displayed through a placeholder property. The placeholder property may provide reminding information that describe expected value of the input field. The reminding information may be displayed when the input field is empty and may be disappeared when the field gains the focus.

The method according to one or more embodiments of the present disclosure, further comprising:

Step B2: when the information input in the information editing area is not empty, the added personnel reminding identifier is displayed near the information input in the information editing area.

For example, when the user enters relevant content in the information editing area, the add personnel reminder identifier is displayed on the right side of the relevant content.

According to one or more embodiments of the present disclosure, the method further includes: when the focus is located in the information editing area and the information input in the editing area is not empty, the added personnel reminding identifier is not displayed. In the present embodiment, when the user inputs content in the information editing area, the added personnel reminding identifier may not be displayed, so as not to interfere with the current user's editing.

Figure 4:
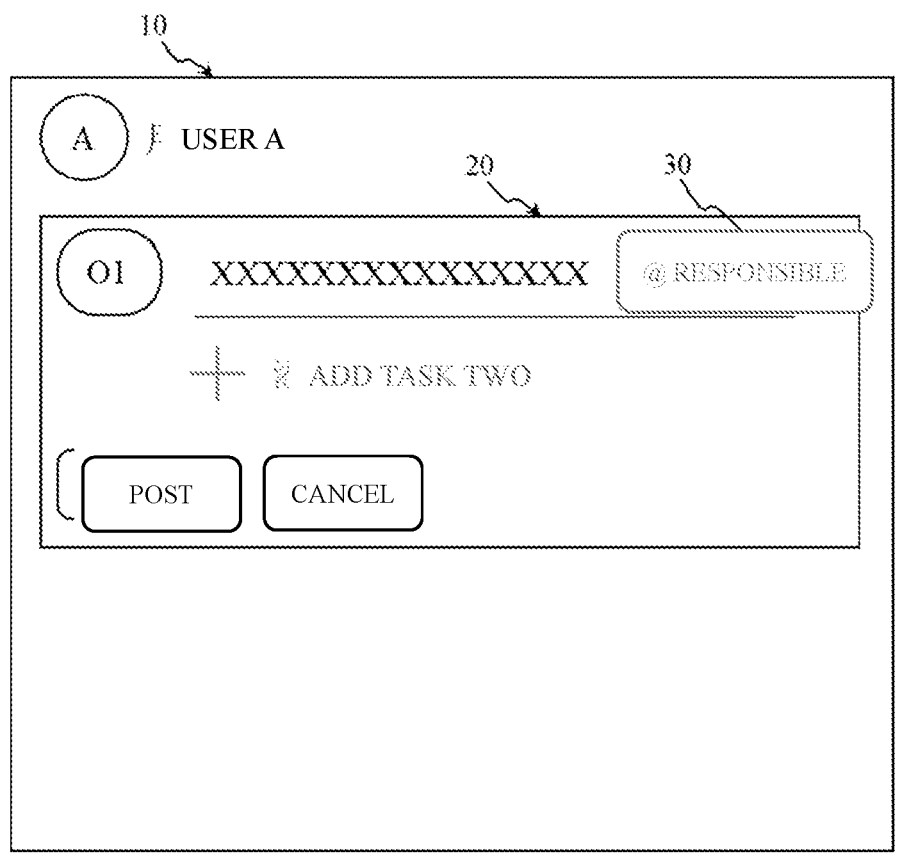
FIG. 4 is a schematic view of an information editing interface according to another embodiment of the present disclosure.

Referring to FIG. 4, after the user enters the information "XXXXXXXXXXXXXX" in the information editing area, the added personnel reminding identifier 30 is displayed on the right side of the information. By displaying the added personnel reminding identifier near the information input by the user, the current user can be reminded in real time to associate the information entered by the user in the information editing area with the corresponding personnel.

The method according to one or more embodiments of the present disclosure, further includes:

Step C1: in response to a triggering operation for the added personnel reminding identifier, displaying a personnel selection interface, the personnel selection interface being used for displaying at least one user identifier;

Step C2: in response to the triggering operation for the user identifier displayed in the personnel selection interface, displaying the triggered user identifier in the information editing area.

In some embodiments, the added personnel reminding identifier may be set in the form of control (e.g., a button control), when the control is triggered, the personnel selection interface is displayed.

In this way, the added personnel reminding identifier can not only serve as reminding information, associating relevant personnel with the information input by the current user, but also serve as an entry point for displaying personnel selection interface to help users add relevant personnel.

Figure 5:
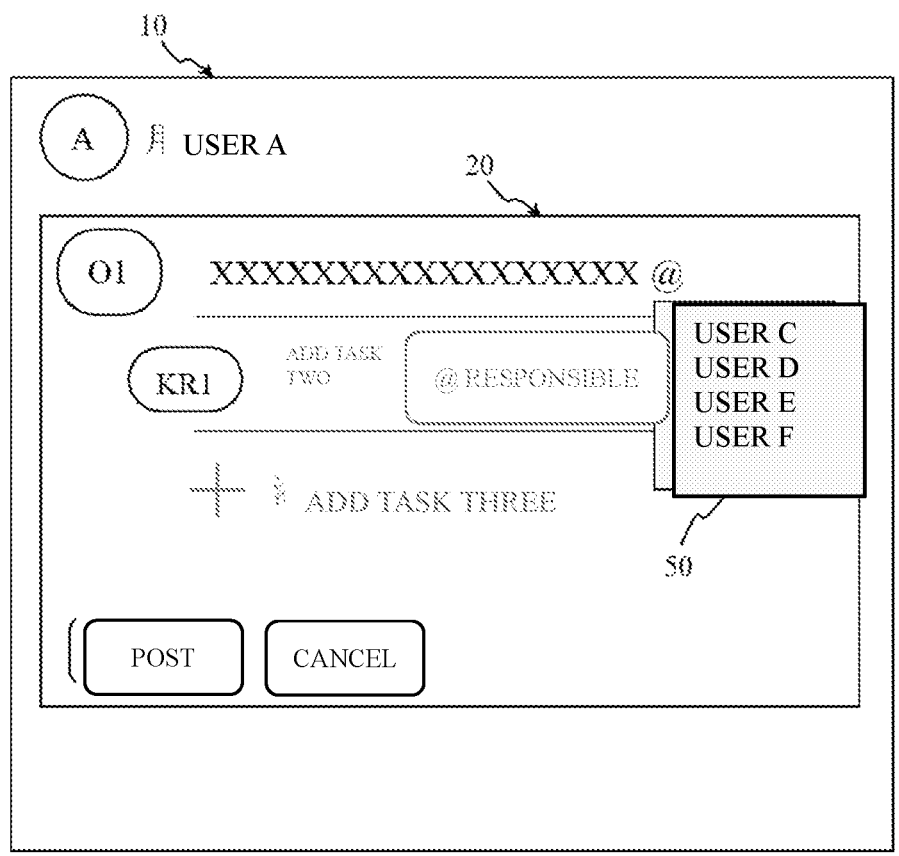
FIG. 5 is a schematic diagram of an information editing interface provided according to a further embodiment of the present disclosure.

Referring to FIG. 5, when the added personnel reminding identifier 30 is triggered by the user, a personnel selection interface 50 may pop up, which may display a plurality of user identifiers, including "User C", "User D", "User E" and "User F" for the user to select. The user may select one or more of these user identifiers to associate the relevant person with the information input by the user in the user editing area. In some embodiments, when the added personnel reminding identifier 30 is triggered by the user, a preset field (e.g., "@") may be displayed at the right side of the information input by the user, and the user identifier selected by the user in the personnel selection interface 50 may be displayed at the right side of the preset field to display which users are selected by the user as associated users of the input information.

In some embodiments, there is a target association between the current user and the user corresponding to the user identifier displayed by the personnel selection interface. For example, the target association includes a superior-subordinate relationship, such as the current user being the superior of the user corresponding to the user identifier. For example, the personnel selection interface is organized to display only subordinate users of the current user.

In some embodiments, when the preset field has been input in the information editing area, the added personnel reminding identifier is not displayed.

In some embodiments, the information editing area may include a first information editing area and a second information editing area. In some embodiments, if a preset field (e.g., "@") has been entered in the first information editing area, the added personnel reminding identifier is not displayed in the first information editing area; if a preset field is not entered in the second information editing area, the added personnel reminding identifier is displayed at a preset position in the second information editing area.

For example, the first information editing area and the second user editing area are respectively used to edit the first information and the second information, and the first information and the second information have an associated relationship. Taking Objectives and Key Results (OKR) as an example, the first information editing area is the object (O) information editing area. The current user can set ab object in the target information editing area. The second information editing area is the key results (KR) information editing area corresponding to the set goal. The current user can input actions needed to achieve the set object in the key results information editing area.

According to one or more embodiments of the disclosure, the method further includes: when the information input in the information editing area is not empty and the information editing area loses the focus, the added personnel reminding identifier is displayed. In the present embodiment, when the user has input contents in the information editing area and the focus is shifted to another position, the user can be reminded to add corresponding personnel associated with the content the input by displaying the reminding identifier.

According to one or more embodiments of the present disclosure, the method further includes: step DI: when the information input in the information editing area is not empty and the information editing area loses focus, displaying the added personnel reminding identifier.

In some embodiments, step DI further includes displaying the added personnel reminding identifier adjacent to the information input in the information editing area.

In some embodiments, step DI further includes when the information input in the first information editing area is not empty, the input information does not include a preset field and the information editing area loses the focus, displaying the added personnel reminding identifier near the information input in the first information editing area.

Figure 6:
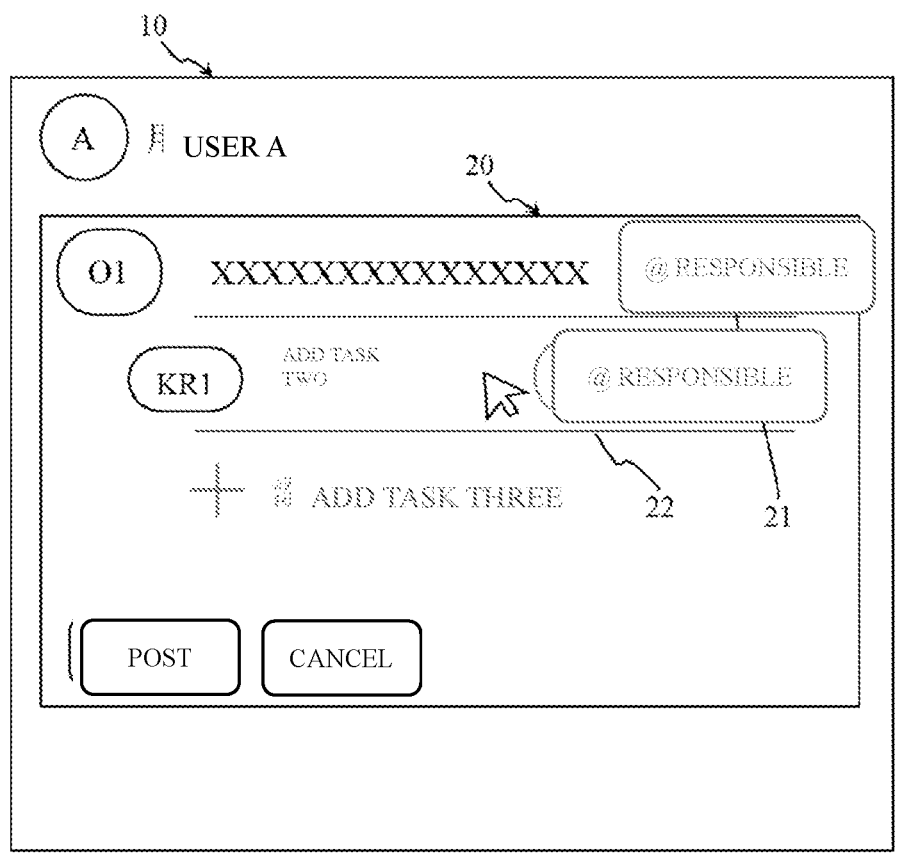
FIG. 6 is a schematic diagram of an information editing interface provided according to a yet embodiment of the present disclosure.

Referring to FIG. 6, an information editing area 20 includes a first information editing area 21 and a second information editing area 22. The first information "XXXXXXXXXXXXXXXX" is input by the current user in the first information editing area 21. When the user clicks on the second information editing area 22 with a cursor, the second information editing area 22 gains the focus, while the first information editing area 21 loses the focus. This is because the first information editing area 21 does not include a preset field (such as "@"), the reminding identifier 30 may be displayed in the first information editing area 21 to remind the current user that the first information has not been associated with the relevant personnel.

In some embodiments, the information editing interface includes an associated personnel sub-interface, the associated personnel sub-interface for displaying a user having a target association with the current user. In the present embodiment, by including the associated personnel sub-interface in the information editing interface, it is convenient for the user when inputting information in the information editing area, associating the relevant personnel with the input information based on users displayed on the associated personnel sub-interface.

Figure 7:
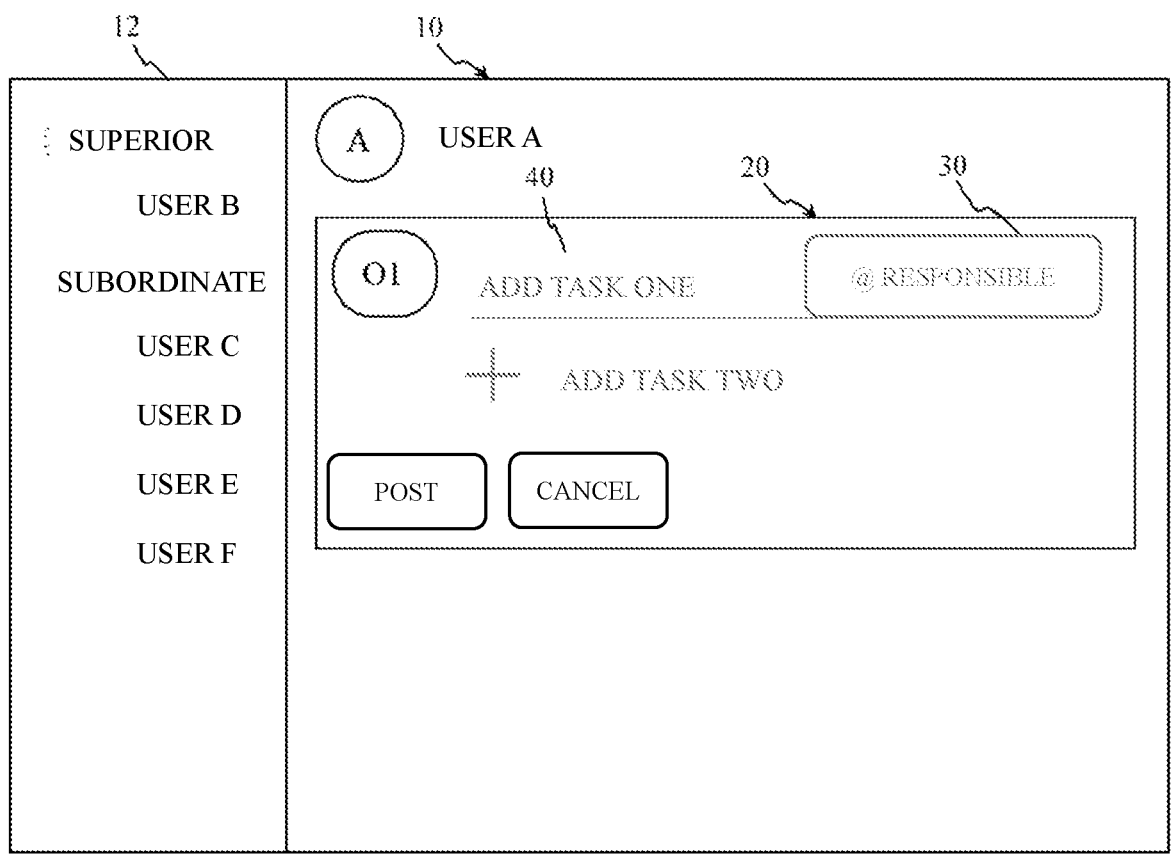
FIG. 7 is a schematic diagram of an information editing interface provided according to another embodiment of the present disclosure.

Referring to FIG. 7, the information editing interface 10 includes an associated personnel sub-interface 12 displaying a superior "user B" and a subordinate "user C", "user D", "user E" and "user F" of the current user ("user A").

Figure 8:
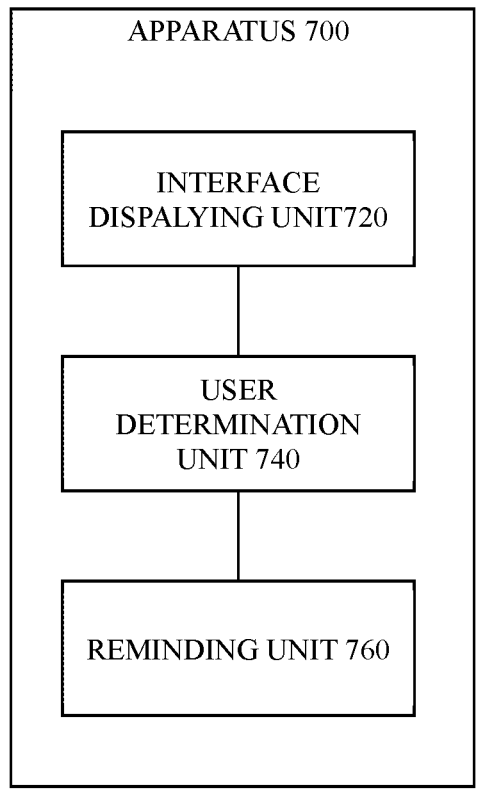
FIG. 8 is a schematic diagram of a structure of an apparatus for displaying reminding information according to an embodiment of the present disclosure.

Accordingly, as shown in FIG. 8, there is provided an apparatus 700 displays reminding information according to an embodiment of the present disclosure, including:
an interface display unit 720 configured to display an information editing interface;
a user determination unit 740 configured to determine whether a preset condition is satisfied;
a reminding unit 760 configured to in response to determining that the preset condition is satisfied, display an added personnel reminding identifier in an information editing area within the information editing interface, the added personnel reminding identifier being used for reminding a current user to associate a corresponding person with information input in the information editing area.

According to one or more embodiments of the present disclosure, the user determination unit is further configured to determine whether the current user satisfies the preset condition; the reminding unit is further configured to in response to determining that the current user satisfies the preset condition, display an added personnel reminding identifier in an information editing area within the information editing interface.

According to one or more embodiments of the present disclosure, the reminding unit is further configured to, when the focus locates in the information editing area, display the added personnel reminding identifier in the information editing area.

According to one or more embodiments of the present disclosure, the reminding unit is further configured to: when the focus is located in the information editing area and information input in the information editing area is empty, display the added personnel reminding identifier in the information editing area.

According to one or more embodiments of the present disclosure, the apparatus for displaying reminding information, further includes:
the first displaying determination unit configured to when information input in the information editing area is empty, display field prompt information in the information editing area;
a displaying position of the field prompt information being located adjacent to a displaying position of the added personnel reminding identifier.

According to one or more embodiments of the present disclosure, the apparatus for disapplying reminding information, further includes:
the second displaying determination configured to when the information input in the information editing area is not empty, a displaying position of the added personnel reminding identifier is located adjacent to the information input in the information editing area.

According to one or more embodiments of the present disclosure, the apparatus for disapplying reminding information, further includes:

the third displaying determination unit configured to when a focus is located in the information editing area and the information input in the information editing area is not empty, skip displaying the added personnel reminding identifier.

According to one or more embodiments of the present disclosure, the apparatus for displaying reminding information, further includes:

a selection interface display unit configured to in response to a triggering operation for the added personnel reminding identifier, display a personnel selection interface, the personnel selection interface being used for displaying at least one user identifier;

a user identifier displaying unit configured to in response to a triggering operation for a user identifier displayed in the personnel selection interface, display the triggered user identifier in the information editing area.

According to one or more embodiments of the present disclosure, the apparatus for displaying remaining information, further includes:

a fourth displaying determination unit configured to when a preset field has been input in the information editing area, skip displaying the added personnel reminding identifier.

According to one or more embodiments of the present disclosure, the apparatus for displaying remaining information, further includes:

a fifth displaying determination unit configured to when the information input in the information editing area is not empty and the information editing area loses focus, display the added personnel reminding identifier.

According to one or more embodiments of the present disclosure, the apparatus for displaying reminding information further includes:

a sixth display determination unit configured to when the information input in the information editing area is not empty, the input information does not comprise a preset field, and the information editing area loses focus, display the added personnel reminding identifier in the information editing area within the information editing interface.

The apparatus for displaying reminding information according to one or more embodiments of the present disclosure, the information editing area in the information editing interface displaying the added personnel reminding identifier includes: displaying the added personnel reminding identifier adjacent to the information input in the information editing area.

The apparatus for displaying reminding information according to one or more embodiments of the present disclosure, the information editing area includes a first information editing area and a second information editing area; the first information editing area and the second user editing area are respectively used for inputting first information and second information, and there is an association between the first information and the second information.

The apparatus for displaying reminding information according to one or more embodiments of the present disclosure, displaying the added personnel reminding identifier in the information editing area within the information editing interface comprises displaying the added personnel reminding identifier in the first information editing area and/or the second information editing area.

As for embodiments of the apparatus, since it basically corresponds to the method embodiment, the relevant parts can be referred to the partial description of the method embodiment. The apparatus embodiment described above is only illustrative, and the modules described as separate modules may or may not be separate. Some or all of the modules can be selected according to actual needs to achieve the purpose of this embodiment. Ordinary technicians in this field can understand and implement it without creative efforts.

Accordingly, according to one or more embodiments of the present disclosure, there is provided an electronic device including:

at least one memory and at least one processor;

where the memory is used to store program codes, and the processor is used to invoke the program codes stored in the memory to cause the electronic device to perform a method of displaying reminding information provided in accordance with one or more embodiments of the present disclosure.

Accordingly, according to one or more embodiments of the present disclosure, there is provided a non-transitory computer storage medium having program codes stored thereon, the program codes, when executed by a computer device, cause the computer device to perform a method for displaying reminding information according to one or more embodiments of the present disclosure provides.

Figure 9:
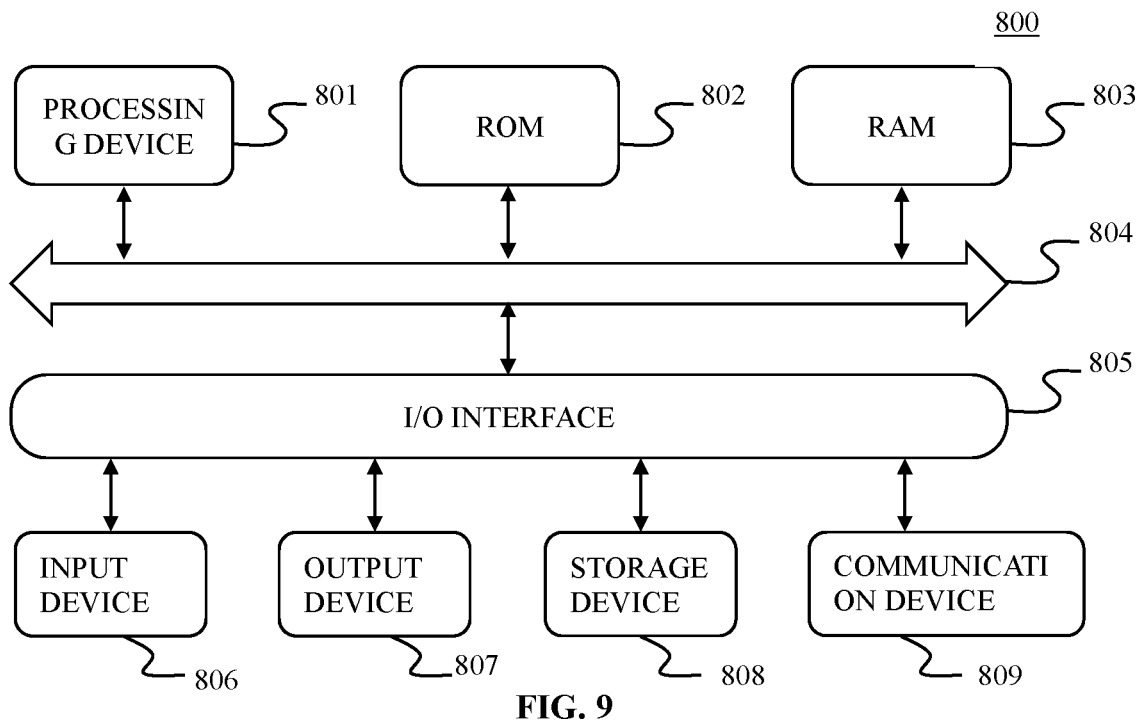
FIG. 9 is a schematic structural diagram of an electronic device according to an embodiment of the present disclosure is provided.

Referring now to FIG. 9, which shows an electronic device suitable for implementing embodiments of the present disclosure (e.g., terminal device or server) 800 is a schematic structural diagram. The terminal device in embodiments of the present disclosure may include but are not limited to mobile phones, laptops, digital broadcast receivers, personal digital assistants (PDAs), PADs (tablets), portable multimedia players (PMPs), vehicle terminal (e.g., car navigation end points) and the like, as well as fixed end points such as digital TVs, desktop computers, etc. The electronic device shown in FIG. 9 is only one example and should not bring any limitation on the functionality and scope of use of the present disclosure embodiment.

As shown in FIG. 9, the electronic device 800 may include a processing device (such as Central Processor, graphics processing unit, etc.) 801, which can perform various appropriate actions and processes based on programs stored in read-only memory (ROM) 802 or loaded from a storage device 808 into random access memory (RAM) 803. In RAM 803, various programs and data required for the operation of the electronic device 800 are also stored. Processing devices 801, ROM 802, and RAM 803 are connected to each other through bus 804. Input/output (I/O) interface 805 is also connected to bus 804.

Typically, the following devices can be connected to an I/O interface 805: an input device 806 including touch screens, touchpads, keyboards, mice, cameras, microphones, accelerometers, gyroscopes, etc.; output devices 807 including liquid crystal displays (LCDs), speakers, vibrators, etc.; a storage device 808 including magnetic tapes, hard disks, and the like; and a communication device 809. The communication device 809 can allow the electronic device 800 to communicate wirelessly or wirelessly with other devices to exchange data. Although FIG. 9 shows the electronic device 800 with various devices, it should be understood that it is not required to implement or have all of the devices shown. More or fewer devices can be implemented or provided alternatively.

In particular, according to embodiments of the present disclosure, the process described above with reference to the flowchart may be implemented as a computer software program. For example, embodiments of the present disclosure include a computer program product including a computer program carried on a computer-readable medium, the computer program including program codes for performing the method shown in the flowchart. In such embodiments, the computer program may be downloaded and installed from the network via the communication device 809, or installed from the storage device 808, or installed from the ROM 802. When the computer program is executed by the processing device 801, the above-described functions defined in the method of the present disclosure are performed.

It should be noted that the computer-readable medium described above in this disclosure can be a computer-readable signal medium or a computer-readable storage medium or any combination thereof. The computer-readable storage medium can be, for example, but not limited to, an electrical, magnetic, optical, electromagnetic, infrared, or semiconductor system, device, or any combination thereof. More specific examples of computer-readable storage media can include but are not limited to: an electrical connection with one or more wires, a portable computer disk, a hard disk, random access memory (RAM), read-only memory (ROM), erasable programmable read-only memory (EPROM or flash memory), optical fibers, portable compact disk read-only memory (CD-ROM), optical storage devices, magnetic storage devices, or any suitable combination thereof. In this disclosure, a computer-readable storage medium can be any tangible medium containing or storing a program that can be used by or in conjunction with an instruction execution system, device, or device. In this disclosure, a computer-readable signal medium can include a data signal propagated in a baseband or as part of a carrier wave, which carries computer-readable program code. Such propagated data signals can take many forms, including but not limited to electromagnetic signals, optical signals, or any suitable combination thereof. Computer-readable signal media can also be any computer-readable medium other than computer-readable storage media, which can send, propagate, or transmit programs for use by or in conjunction with instruction execution systems, devices, or devices. The program code contained on the computer-readable medium can be transmitted using any suitable medium, including but not limited to: wires, optical cables, radio frequency (RF), etc., or any suitable combination thereof.

In some embodiments, the client and server may communicate using any currently known or future developed network protocol such as HyperText Transfer Protocol (HTTP), and may be interconnected with any form or medium of digital data communication (e.g., a communication network). Examples of communication networks include local area networks ("LANs"), wide area networks ("WANs"), the Internet (e.g., the Internet), and end-to-end networks (e.g., ad hoc end-to-end networks), as well as any currently known or future developed networks.

The computer-readable medium can be included in the electronic device, or it can exist alone and not assembled into the electronic device.

The computer-readable medium carries one or more programs, and when the one or more programs are executed by the electronic device, the electronic device performs the method disclosed above.

Computer program code for performing the operations of the present disclosure may be written in one or more programming languages, or combinations thereof, including Object Oriented programming languages such as Java, Smalltalk, C++, as well as conventional procedural programming languages such as "C" or similar programming languages. The program code may be executed entirely on the user's computer, partially on the user's computer, as a standalone software package, partially on the user's computer, or entirely on a remote computer or server. In the case of a remote computer, the remote computer may be connected to the user's computer via any type of network, including a local area network (LAN) or a wide area network (WAN), or may be connected to an external computer (e.g., via the Internet using an Internet service provider).

The flowcharts and block diagrams in the accompanying drawings illustrate the architecture, functions, and operations of systems, methods, and computer program products that may be implemented in accordance with various embodiments of the present disclosure. in this regard, each block in the flowchart or block diagram may represent a module, program segment, or portion of code that contains one or more executable instructions for implementing a specified logical function. It should also be noted that in some alternative implementations, the functions marked in the blocks may also occur in a different order than those marked in the figures. For example, two blocks represented in succession may actually be executed substantially in parallel, and they may sometimes be executed in the opposite order, depending on the function involved. It should also be noted that each block in the block diagram and/or flowchart, and combinations of blocks in the block diagram and/or flowchart, may be implemented using a dedicated hardware-based system that performs the specified function or operation, or may be implemented using a combination of dedicated hardware and computer instructions.

Description in the present disclosure related to the disclosed unit may be implemented by way of software, may be implemented by way of hardware, wherein the name of the unit does not constitute a limitation on the unit itself in some cases.

The functions described above herein may be performed at least in part by one or more hardware logic components. For example, without limitation, exemplary types of hardware logic components that may be used include: field programmable gate arrays (FPGAs), application specific integrated circuits (ASICs), application specific standard products (ASSPs), system-on-chip (SOCs), complex programmable logic devices (CPLDs), and the like.

In the context of this disclosure, machine-readable media can be tangible media that can contain or store programs for use by or in conjunction with instruction execution systems, devices, or devices. Machine-readable media can be machine-readable signal media or machine-readable storage media. Machine-readable media can include, but are not limited to, electronic, magnetic, optical, electromagnetic, infrared, or semiconductor systems, devices, or devices, or any suitable combination thereof. More specific examples of machine-readable storage media may include electrical connections based on one or more wires, portable computer disks, hard disks, random access memory (RAM), read-only memory (ROM), erasable programmable read-only memory (EPROM or flash memory), optical fibers, convenient compact disk read-only memory (CD-ROM), optical storage devices, magnetic storage devices, or any suitable combination thereof.

According to one or more embodiments of the present disclosure, there is provided a method for displaying reminding information, comprising: displaying an information editing interface; determining whether a preset condition is satisfied; in response to determining that the preset condition is satisfied, displaying an added personnel reminding identifier in an information editing area within the information editing interface, the added personnel reminding identifier being used for reminding a current user to associate a corresponding person with information input in the information editing area.

According to one or more embodiments of the present disclosure, the preset condition includes at least one of the following: the current user satisfying the preset condition; a focus being located in the information editing area; no preset field input in the information editing area.

According to one or more embodiments of the present disclosure, determining whether the preset condition is satisfied comprises: determining whether the current user satisfies the preset condition; in response to determining that the preset condition is satisfied, displaying an added personnel reminding identifier in an information editing area within the information editing interface comprises: in response to determining that the current user satisfies the preset condition, displaying an added personnel reminding identifier in an information editing area within the information editing interface.

According to one or more embodiments of the present disclosure, in response to determining that the preset condition is satisfied, displaying an added personnel reminding identifier at a first preset position in an information editing area within the information editing interface comprises if a focus is located in the information editing area, displaying the added personnel reminding identifier in the information editing area.

According to one or more embodiments of the present disclosure, if the focus locates in the information editing area, displaying the added personnel reminding identifier in the information editing area comprises if the focus is located in the information editing area and information input in the information editing area is empty, displaying the added personnel reminding identifier in the information editing area.

According to one or more embodiments of the present disclosure, the method for displaying reminding information, further includes: if information input in the information editing area is empty, displaying field prompt information in the information editing area; a displaying position of the field prompt information being located adjacent to a displaying position of the added personnel reminding identifier.

According to one or more embodiments of the present disclosure, the method for displaying reminding information, further includes: if the information input in the information editing area is not empty, a displaying position of the added personnel reminding identifier is located adjacent to the information input in the information editing area.

According to one or more embodiments of the present disclosure, the method for displaying reminding information, further includes: if a focus is located in the information editing area and the information input in the information editing area is not empty, skipping displaying the added personnel reminding identifier.

According to one or more embodiments of the present disclosure, the method for displaying reminding information, further includes: in response to a triggering operation for the added personnel reminding identifier, displaying a personnel selection interface, the personnel selection interface being used for displaying at least one user identifier; in response to a triggering operation for a user identifier displayed in the personnel selection interface, displaying the triggered user identifier in the information editing area.

The method for displaying reminding information according to one or more embodiments of the present disclosure, there is a target association between the current user and a user corresponding to the user identifier displayed on the personnel selection interface.

According to one or more embodiments of the present disclosure, the method for displaying reminding information, further includes: the information editing interface comprises an associated personnel sub-interface, and the associated personnel sub-interface is used for displaying a user that has a target association with the current user.

According to one or more embodiments of the present disclosure, the current user satisfying the preset condition comprises: the current user having a target association with at least one further user.

According to one or more embodiments of the present disclosure, the target association includes a superior-subordinate relationship.

According to one or more embodiments of the present disclosure, the method for displaying reminding information, further includes: if a preset field has been input in the information editing area, skipping displaying the added personnel reminding identifier.

According to one or more embodiments of the present disclosure, the method for displaying remaining information further includes:
if the information input in the information editing area is not empty and the information editing area loses focus, displaying the added personnel reminding identifier.

According to one or more embodiments of the present disclosure, the method for displaying reminding information further includes:
if the information input in the information editing area is not empty, the input information does not comprise a preset field, and the information editing area loses focus, displaying the added personnel reminding identifier in the information editing area within the information editing interface.

According to one or more embodiments of the present disclosure, displaying the added personnel reminding identifier in the information editing area within the information editing interface comprises: displaying the added personnel reminding identifier adjacent to the information input in the information editing area.

According to one or more embodiments of the present disclosure, the information editing area comprises a first information editing area and a second information editing area; the first information editing area and the second user editing area are respectively used for inputting first information and second information, and there is an association between the first information and the second information.

According to one or more embodiments of the present disclosure, displaying the added personnel reminding identifier in the information editing area within the information editing interface comprises displaying the added personnel reminding identifier in the first information editing area and/or the second information editing area.

According to one or more embodiments of the present disclosure, there is provided an apparatus for displaying reminding information, comprising: an interface display unit configured to display an information editing interface; a user determination unit configured to determine whether a preset condition is satisfied; a reminding unit configured to in response to determining that the preset condition is satisfied, display an added personnel reminding identifier in an information editing area within the information editing interface, the added personnel reminding identifier being used for reminding a current user to associate a corresponding person with information input in the information editing area.

According to one or more embodiments of the present disclosure, there is provided an electronic device, comprising: at least one memory and at least one processor; wherein the memory is used to store program codes, and the processor is used to invoke the program codes stored in the memory to cause the electronic device to perform any one of the methods according to one or more embodiments of the present disclosure is provided.

According to one or more embodiments of the present disclosure, there is provided a non-transitory computer storage medium having program codes stored thereon, the program codes, when executed by a computer device, cause the computer device to perform a method according to one or more embodiments of the present disclosure.

The above descriptions are only example embodiments of the present disclosure and an explanation of the technical principles used. Those skilled in the art should understand that the scope of the disclosure involved in this disclosure is not limited to the specific combination of the technical features of the above technical solutions, but should also cover other technical solutions formed by any combination of the above technical features or equivalent features without departing from the above disclosure concept. For example, the technical solutions formed by replacing the above features with (but not limited to) technical features with similar functions disclosed in this disclosure.

In addition, although the operations are depicted in a specific order, this should not be understood as requiring these operations to be performed in the specific order shown or in sequential order. Under certain circumstances, multitasking and parallel processing may be advantageous. Similarly, although several specific implementation details are included in the above discussion, these should not be construed as limiting the scope of the present disclosure. Certain features described in the context of individual embodiments may also be implemented in combination in a single embodiment. Conversely, various features described in the context of a single embodiment may also be implemented in multiple embodiments individually or in any suitable sub combination.

Although the subject matter has been described in language specific to structural features and/or methodological logical acts, it should be understood that the subject matter defined in the appended claims is not necessarily limited to the particular features or acts described above. Rather, the particular features and acts described above are merely exemplary forms of implementation of the claims.

We claim:

1. A method for displaying reminding information, comprising:
   displaying an information editing interface;
   determining whether a preset condition is satisfied; and
   in response to determining that the preset condition is satisfied, displaying an added personnel reminding identifier in an information editing area within the information editing interface, the added personnel reminding identifier being used for reminding a current user to associate a corresponding person with information input in the information editing area,
   wherein the method further comprises:
   in response to a triggering operation for the added personnel reminding identifier, displaying a personnel selection interface, the personnel selection interface being used for displaying at least one user identifier; and
   in response to a triggering operation for a user identifier displayed in the personnel selection interface, displaying the triggered user identifier in the information editing area,
   wherein there is a target association including a superior-subordinate relationship between the current user and a user corresponding to the user identifier displayed on the personnel selection interface.

2. The method for displaying reminding information of claim 1, wherein the preset condition comprises at least one of the following:
   the current user satisfying the preset condition,
   a focus being located in the information editing area, or
   no preset field input in the information editing area.

3. The method for displaying reminding information of claim 2, wherein the current user satisfying the preset condition comprises:
   the current user having a target association with at least one further user.

4. The method for displaying reminding information of claim 1, wherein determining whether the preset condition is satisfied comprises: determining whether the current user satisfies the preset condition; and
   in response to determining that the preset condition is satisfied, displaying an added personnel reminding identifier in an information editing area within the information editing interface comprises: in response to determining that the current user satisfies the preset condition, displaying an added personnel reminding identifier in an information editing area within the information editing interface.

5. The method for displaying reminding information of claim 1, wherein in response to determining that the preset condition is satisfied, displaying an added personnel reminding identifier at a first preset position in an information editing area within the information editing interface comprises:
   in response to that a focus is located in the information editing area, displaying the added personnel reminding identifier in the information editing area.

6. The method for displaying reminding information of claim 5, wherein in response to that the focus locates in the information editing area, displaying the added personnel reminding identifier in the information editing area comprises:
   in response to that the focus is located in the information editing area and information input in the information editing area is empty, displaying the added personnel reminding identifier in the information editing area.

7. The method for displaying reminding information of claim 1, further comprising:
   in response to that information input in the information editing area is empty, displaying field prompt information in the information editing area; a displaying position of the field prompt information being located adjacent to a displaying position of the added personnel reminding identifier.

8. The method for displaying reminding information of claim 1, wherein
   in response to that the information input in the information editing area is not empty, a displaying position of the added personnel reminding identifier is located adjacent to the information input in the information editing area.

9. The method for displaying reminding information of claim 1, further comprising:

in response to that a focus is located in the information editing area and the information input in the information editing area is not empty, skipping displaying the added personnel reminding identifier.

10. The method for displaying reminding information of claim 1, wherein
the information editing interface comprises an associated personnel sub-interface, and the associated personnel sub-interface is used for displaying a user that has a target association with the current user.

11. The method for displaying reminding information of claim 1, further comprising:
in response to that a preset field has been input in the information editing area, skipping displaying the added personnel reminding identifier.

12. The method for displaying reminding information of claim 1, further comprising:
in response to that the information input in the information editing area is not empty and the information editing area loses focus, displaying the added personnel reminding identifier.

13. The method for displaying reminding information of claim 1, further comprising:
in response to that the information input in the information editing area is not empty, the input information does not comprise a preset field, and the information editing area loses focus, displaying the added personnel reminding identifier in the information editing area within the information editing interface.

14. The method for displaying reminding information of claim 13, wherein displaying the added personnel reminding identifier in the information editing area within the information editing interface comprises:
displaying the added personnel reminding identifier adjacent to the information input in the information editing area.

15. The method for displaying reminding information of claim 1, wherein
the information editing area comprises a first information editing area and a second information editing area; the first information editing area and the second user editing area are respectively used for inputting first information and second information, and there is an association between the first information and the second information.

16. An electronic device, comprising:
at least one memory and at least one processor;
wherein the memory is used to store program codes, and the processor is used to invoke the program codes stored in the memory to cause the electronic device to perform:
displaying an information editing interface;
determining whether a preset condition is satisfied; and
in response to determining that the preset condition is satisfied, displaying an added personnel reminding identifier in an information editing area within the information editing interface, the added personnel reminding identifier being used for reminding a current user to associate a corresponding person with information input in the information editing area
wherein the method further comprises:
in response to a triggering operation for the added personnel reminding identifier, displaying a personnel selection interface, the personnel selection interface being used for displaying at least one user identifier; and
in response to a triggering operation for a user identifier displayed in the personnel selection interface, displaying the triggered user identifier in the information editing area,
wherein there is a target association including a superior-subordinate relationship between the current user and a user corresponding to the user identifier displayed on the personnel selection interface.

17. A non-transitory computer storage medium having program codes stored thereon, the program codes, when executed by a computer device, cause the computer device to perform:
displaying an information editing interface;
determining whether a preset condition is satisfied; and
in response to determining that the preset condition is satisfied, displaying an added personnel reminding identifier in an information editing area within the information editing interface, the added personnel reminding identifier being used for reminding a current user to associate a corresponding person with information input in the information editing area
wherein the method further comprises:
in response to a triggering operation for the added personnel reminding identifier, displaying a personnel selection interface, the personnel selection interface being used for displaying at least one user identifier; and
in response to a triggering operation for a user identifier displayed in the personnel selection interface, displaying the triggered user identifier in the information editing area, wherein there is a target association including a superior-subordinate relationship between the current user and a user corresponding to the user identifier displayed on the personnel selection interface.

\* \* \* \* \*